United States Patent [19]

Padwekar

[11] Patent Number: 5,652,847
[45] Date of Patent: Jul. 29, 1997

[54] CIRCUIT AND SYSTEM FOR MULTIPLEXING DATA AND A PORTION OF AN ADDRESS ON A BUS

[76] Inventor: Kiran A. Padwekar, 1520 Vista Club Cir. #203, Santa Clara, Calif. 95054

[21] Appl. No.: 573,440

[22] Filed: Dec. 15, 1995

[51] Int. Cl.$^6$ .............................. G06F 13/40; G06F 12/02
[52] U.S. Cl. ........................................ 395/306; 395/421.01
[58] Field of Search .................................. 395/306–309, 395/401, 402, 800, 500, 775, 421.01; 365/189.02, 189.05, 230.02

[56] References Cited

U.S. PATENT DOCUMENTS

| | | | |
|---|---|---|---|
| 4,422,142 | 12/1983 | Inaba et al. | 395/308 |
| 4,613,953 | 9/1986 | Bush et al. | 395/402 |
| 4,860,198 | 8/1989 | Takenaka | 395/307 |
| 5,113,369 | 5/1992 | Kinoshita | 395/307 |
| 5,262,991 | 11/1993 | Pope | 365/189.02 |
| 5,263,141 | 11/1993 | Sawaki et al. | 395/800 |
| 5,359,717 | 10/1994 | Bowles et al. | 395/309 |
| 5,369,651 | 11/1994 | Marisetty | 371/40.1 |
| 5,519,872 | 5/1996 | Khandekar et al. | 395/775 |

Primary Examiner—Gopal C. Ray

[57] ABSTRACT

A microcontroller or microprocessor architecture with a multiplexed address and data bus wherein the high order address bits are multiplexed with the low order data bits. Under this scheme, the low order address bits are connected directly to the memory and the high order address bits are latched by an address latch which captures the data on the bus when an address latch enable (ALE) signal is asserted. With the high order address bits multiplexed with the data bits, multiple data transfers can be performed without repeated address cycles since there is no need to place the high address bits which have already been latched on the multiplexed bus. The address and data buses are demultiplexed when the high order address bits are latched using ALE. When the address crosses the page boundary, the crossover is detected, by comparing the current high order address bits with the high order address bits of the previous bus cycle, and an address cycle is generated.

6 Claims, 4 Drawing Sheets

CIRCUIT AND SYSTEM FOR MULTIPLEXING DATA AND A PORTION OF AN ADDRESS ON A BUS

FIELD OF THE INVENTION

The invention is in the field of multiplied buses as employed in microcontroller and microprocessor architectures.

BACKGROUND OF THE INVENTION

In the prior art, in microcontroller and microprocessor multiplexed buses, address information and data are ordered the same. That is, assuming a memory with 16 bit addressing, with 8-bit data represented as D0:D7, and the 16 bit address represented as A0:A15, the low order address bits and the data bits are multiplexed on a bus as A0/D0, A1/D1, A2/D2...A7/D7. Under this scheme, the high order address bits A8:A15 are connected directly to the memory and the low order address bits are latched by an address latch which captures the data on the bus when an address latch enable (ALE) signal is asserted. As a result, when accesses to consecutive memory locations are required, as is frequently the case, since the low order address bits have changed, in order to properly access the memory, the address must be placed on the address bus meaning the multiplexed data/address bus must have an address placed on it. This multiplexing operation results in reduced performance as compared with operations in which there is no such multiplexing. However, in many applications, cost considerations dictate the use of a microcontroller with such a multiplexing scheme over a microcontroller which does not multiplex the address and data buses, but which is more expensive.

SUMMARY OF THE INVENTION

The present invention is directed to a microcontroller or microprocessor architecture with a multiplexed address and data bus wherein the high order address bits are multiplexed with the data bits. That is, assuming a memory with 16 bit addressing, with 8-bit data represented as D0:D7, and the 16 bit address represented as A0:A15, the high order address bits and the data bits are multiplexed on a bus as A8/D0, A9/D1, A10/D2 . . . A15/D7. Under this scheme, the low order address bits A0:A7 are connected directly to the memory and the high order address bits A8:A15 are latched by an address latch which captures the data on the bus when an address latch enable (ALE) signal is asserted. With the high order address bits multiplexed with the data bits, and with 256 byte pages, 256 8-bit transfers can be performed without repeated address cycles since there is no need to place the high order address bits, which have already been latched, on the multiplexed bus.

This technique provides performance comparable to burst mode read or write without the overhead of switching the high order address so long as the address is within the low order address space. That is, once the high order address bits on the address bus are latched, data reads and writes from/to addresses resulting from low order address changes only can be performed without multiplexing with the high order address.

The address and data buses are demultiplexed when the high order address bits are latched using ALE. When the address crosses the page boundary, the crossover is detected, by comparing the current high order address bits with the high order address bits of the previous bus cycle, and an address cycle is generated. In this case, the bus cycle reverts back to a conventional bus cycle, i.e., multiplexing address and data on the same bus.

Assuming an 8-bit memory with a 16-bit address, the present invention provides the following advantages:

i) Performance comparable to 16-bit multiplexed bus or 8-bit burst mode bus.

ii) Propagation delay through the address latch is eliminated for the low-order address bits which are connected directly to memory.

iii) Since the address and data buses become demultiplexed buses when the high order address bits are latched, the time wasted in turning the multiplexed bus is eliminated and memory bandwidth is maximized.

iv) Noise is reduced due to fewer ALE activations and bus switches.

The invention has application to any architecture which multiplexes some data and address bits on a single bus. With the invention, the low order address bits are on a dedicated bus, i.e., not multiplexed with the data bus, and the high order address bits are multiplexed with the data bits.

DETAILED DESCRIPTION OF THE INVENTION

Figure 1:
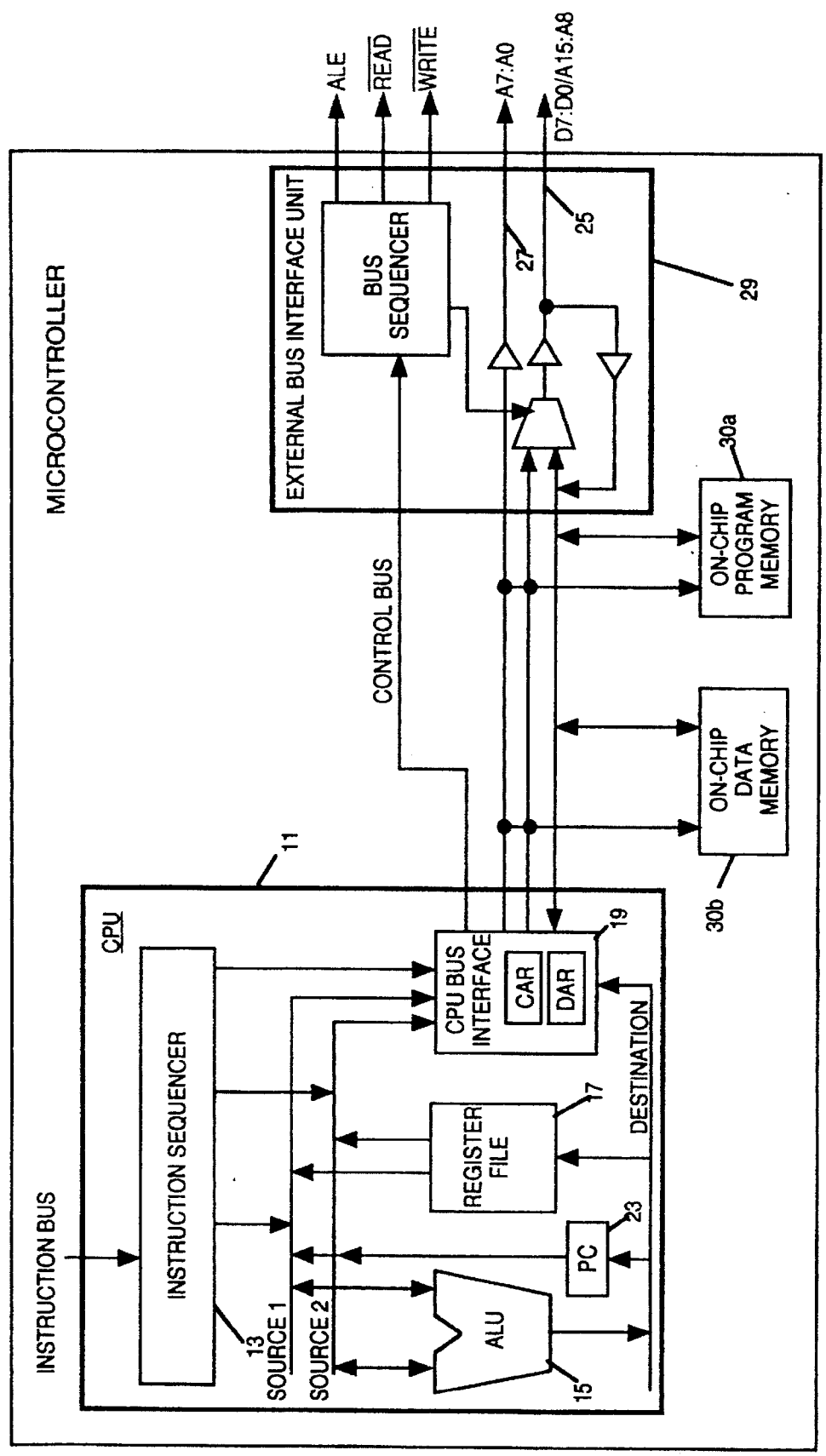
FIG. 1 is a block diagram showing the functional blocks of an architecture of a suitable microcontroller which may utilize the invented multiplexed bus with page mode support.

Referring to FIG. 1, the functional blocks of an architecture of a suitable microcontroller which may utilize the invented multiplexed bus with page mode support are shown. Although a typical microcontroller may include additional functional blocks, the functional blocks shown in FIG. 1 are sufficient for explaining how to make and use the present invention. Additionally, persons skilled in the field of the invention will recognize that numerous timing, control and power signals are needed, however, the specifics of such additional signals are highly dependent on the specifics of the microcontroller implementation and are not needed for a proper understanding of the present invention.

The microcontroller shown in FIG. 1 includes a central processing unit CPU 11 having an instruction sequencer 13, ALU 15, register file 17, CPU bus interface 19, program counter (PC) 23, source bus 1, source bus 2 and destination bus. The CPU communicates with the other elements of the microcontroller using a data bus 25, address bus 27 and external bus interface unit 29. CPU bus interface 19 feeds instructions to instruction sequencer 13 over an instruction bus. On-chip code or program memory 30a, which is typically a read only memory (ROM), is used to contain a user program which controls the operation of the microcontroller and connects to the CPU over data bus 25 and address bus 27 through CPU bus interface 19. An on-chip data memory 30b, which is typically a random access memory (RAM), contains data used by the program in program memory as it is run in CPU 11. The microcontroller communicates with the outside world using I/O ports (not shown) which are coupled to the memory data bus 25 and memory address bus 27 and peripherals (not shown) which are coupled to a peripheral bus (not shown) and to the data bus and data address bus through a peripheral interface (not shown). User programs may also be stored in external memories coupled to the microcontroller through the I/O ports. Data used by running programs may also come from or be sent to the peripherals.

The CPU accesses code and data through two different buses. CPU bus interface 19 feeds the instruction bus with code from on-chip program memory or external memory, both connected to the data bus 25. Internal data access is either to/from register file 17 or through data bus 25 which is connected to the on-chip data memory, the peripheral interface and CPU bus interface 19. Data accesses to peripherals connected to the peripheral bus are facilitated by a peripheral interface unit (not shown), while accesses to peripherals through the I/O ports are facilitated by CPU bus interface 19. The CPU bus interface 19 also transfers data between the address bus 27 and the data bus 25.

The present invention lies mainly in the implementation of data bus 25, address bus 27 and logic in CPU bus interface 19 and external bus interface unit 29, where the high order the address bits on the address bus are multiplexed with data on the data bus. For example, assuming a memory with 16 bit addressing with 8-bit data represented as D0:D7 and the 16 bit address represented as A0:A15, the high order address bits and the data bits are multiplexed on a bus as A8/D0, A9/D1, A10/D2 . . . A15/D7. Under this scheme, the low order address bits A0:A7 are connected directly to the external memory and the high order address bits are latched by an address latch which captures the data on the bus when an address latch enable (ALE) signal is asserted. With the high order address bits multiplexed with the data bits, and with 256 byte pages, 256 8-bit transfers can be performed within one page without repeated address cycles since there is no need to place the high address bits which have already been latched on the multiplexed bus.

Figure 2:
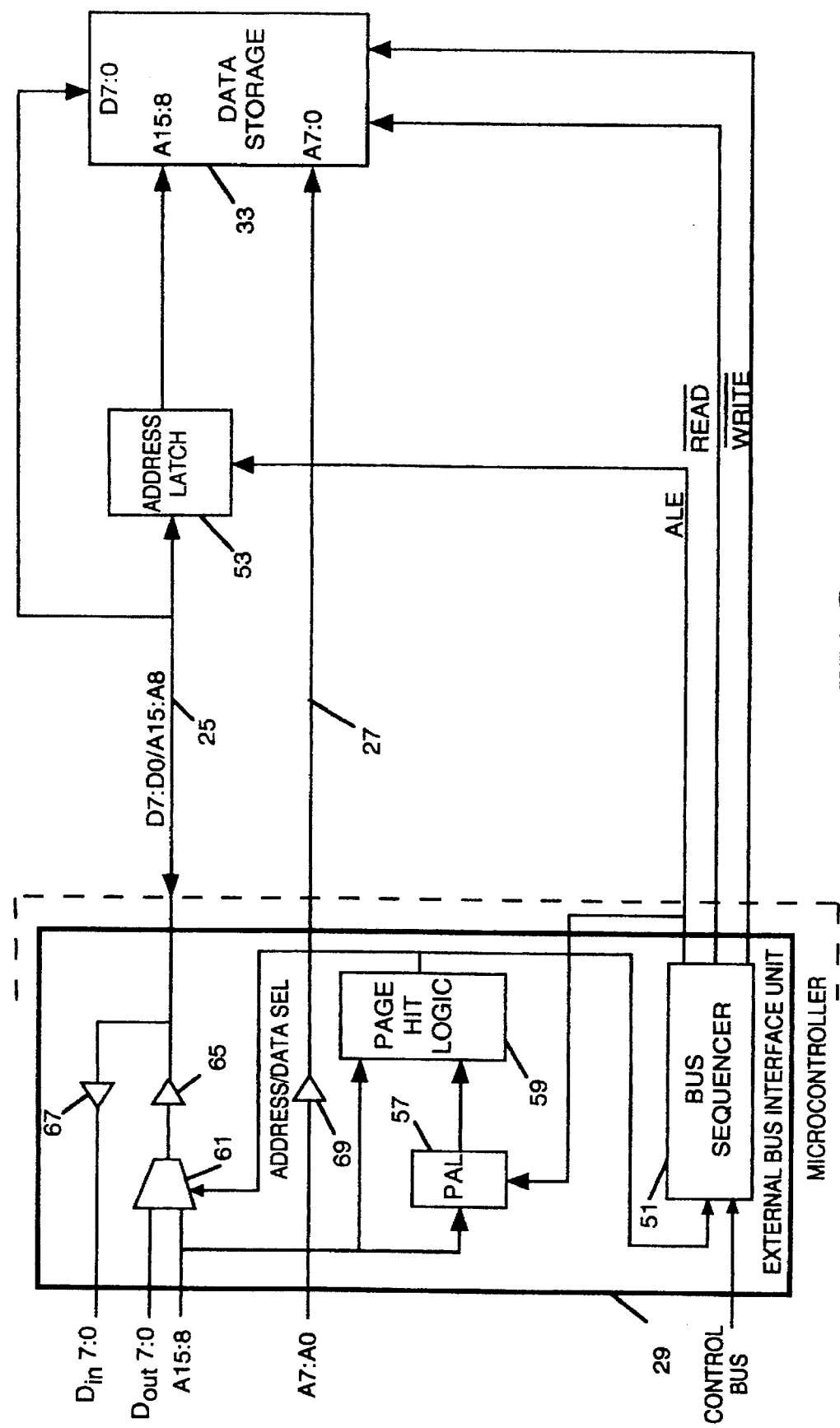
FIG. 2 is a block diagram showing the components for implementing the invented multiplexed bus with page mode support.

FIG. 2 shows how the multiplexed data/address bus with page mode support of the type contemplated by the present invention may be implemented.

A paging scheme with multiplexed address and data bus requires the following:

i) A multiplexed bus in which the high order address bits are multiplexed with the data and the low order address bits are not multiplexed.

ii) A bus controller that takes advantage of the multiplexed bus by running address cycles only when the upper address bits change from what they were during the previous bus cycle.

The CPU bus interface 19 via a control bus 21 is coupled to external bus interface unit 29 which controls the multiplexed data/address bus as shown in FIG. 2. The external bus interface unit runs data read bus cycles and data write bus cycles (referred to as bus cycles) on the multiplexed data/ address bus.

The external bus interface unit runs an initial bus cycle by running an address cycle followed by a data cycle. The external bus interface unit, during the address cycle, outputs the entire address A7:A0 and A15:A8 and, through a bus sequencer, generates an Address Latch Enable (ALE) strobe. The conditions under which ALE is generated by bus sequencer 51 (which also generates the signals READ and WRITE to memory 33) indicating that the address on the address bus is valid and can be latched should be apparent to persons skilled in the art. An address latch 53, demultiplexes the high order address bits A15:A8 (the page address) by latching them in address latch 53 on ALE. The low order address bits A7:A0 are not multiplexed and are always driven and coupled to data memory 33, and, therefore need not be latched externally. During a data cycle, the external bus interface unit generates a read or write strobe, as appropriate and the data is transferred (read/written) on the data bus at each read/write strobe. The low order address bits A7:A0 are not multiplexed and therefore driven just as during the address cycle.

The external bus interface unit 29 latches the page address internally in page address latch (PAL) 57 on ALE during the address cycle. On subsequent bus cycles, page hit logic 59 compares the upper address bits A15:A8 (the page address) with the latched page address in PAL 57. If the page address on A15:A8 matches the latched page address from the PAL, a page hit signal is generated as a control input to multiplexor 61, otherwise the bus cycle is considered to be a page miss. In case of a page hit, there is no need to run an address cycle as the address latch 53 has the correct page address which is being provided to data memory 33 and therefore need not be updated. The external bus interface unit 29 skips the address cycles and runs only the data cycles for subsequent bus cycles as long as the bus cycles result in page hits. If there is a page miss, the external bus interface unit generates an address cycle to update external address latch 53 and follows with the data cycle.

Multiplexor 61 is used to switch between output data on D7:D0 and high order address bits A15:A8 using the signal generated by page hit logic 59. That is, multiplexor 61 selects D7:D0 so long as there are page misses and selects A15:A8 after a page hit is detected so that the new high order address bits can be made available for latching by address latch 53.

Output buffer 65 and input buffer 67 are used as buffers during switches between high order address bits and data on data bus 25. Buffer 69 is used as a buffer for the low order address bits.

Figure 3:
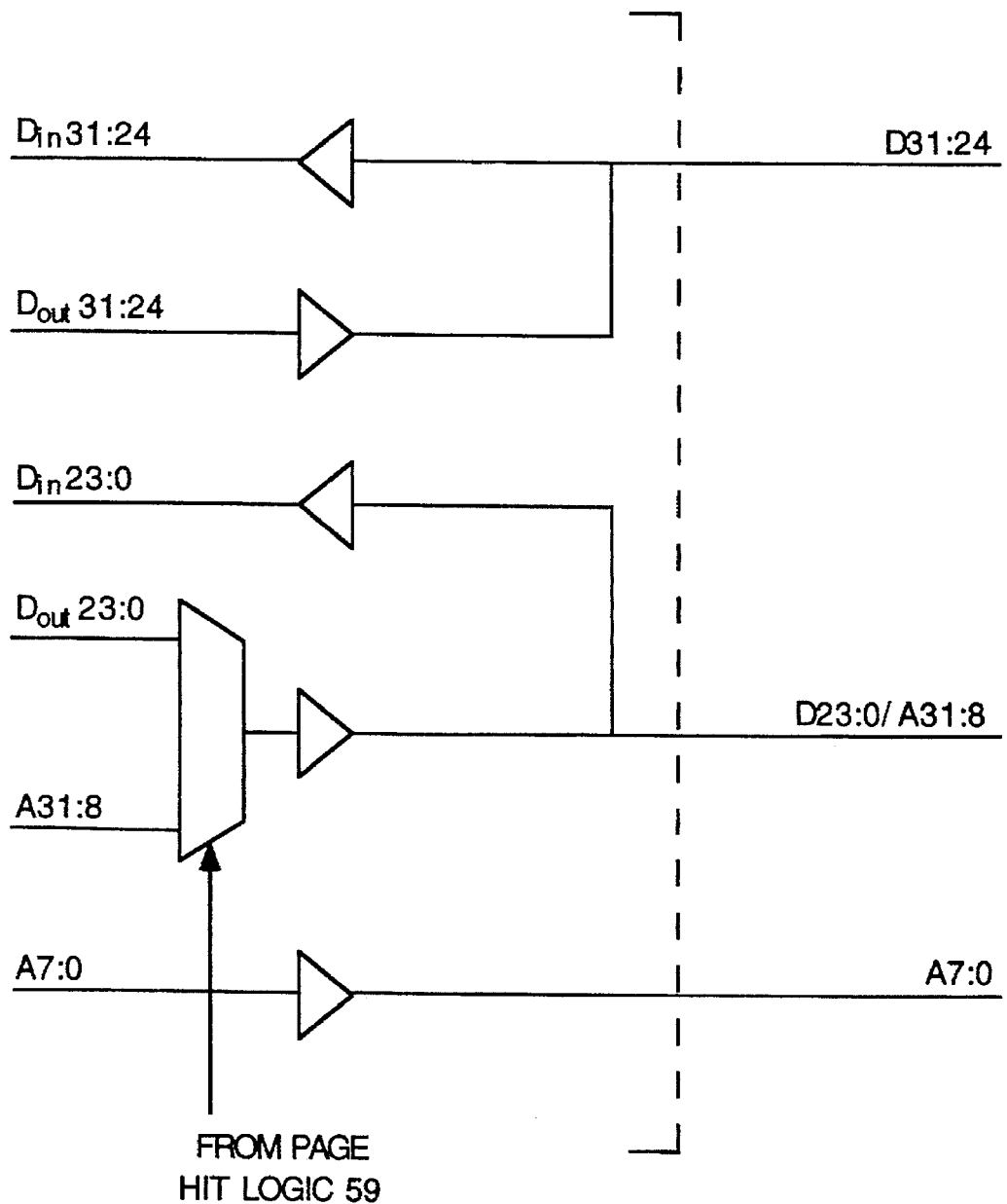
FIG. 3 shows an alternate embodiment of the invention.

Using this scheme, consecutive reads from/writes to memory can be performed with a multiplexed address/data bus without the usual overhead associated with a multiplexed address/data bus. Instead of having to multiplex address and data, switches between data and address are limited to accesses outside the current page defined by the high order address bits. In the example described above, the high order address bits A15:A8 cover any address within a 256 byte page address space. However, the inventive concepts are applicable to any multiplexed data/address bus where the lower order bits of the address are not multiplexed with data bits. For example, FIG. 3 shows how the inventive concepts would be applied to a 32-bit data bus (D31:D0) and a 32-bit address bus (A31:A0).

Figure 4:
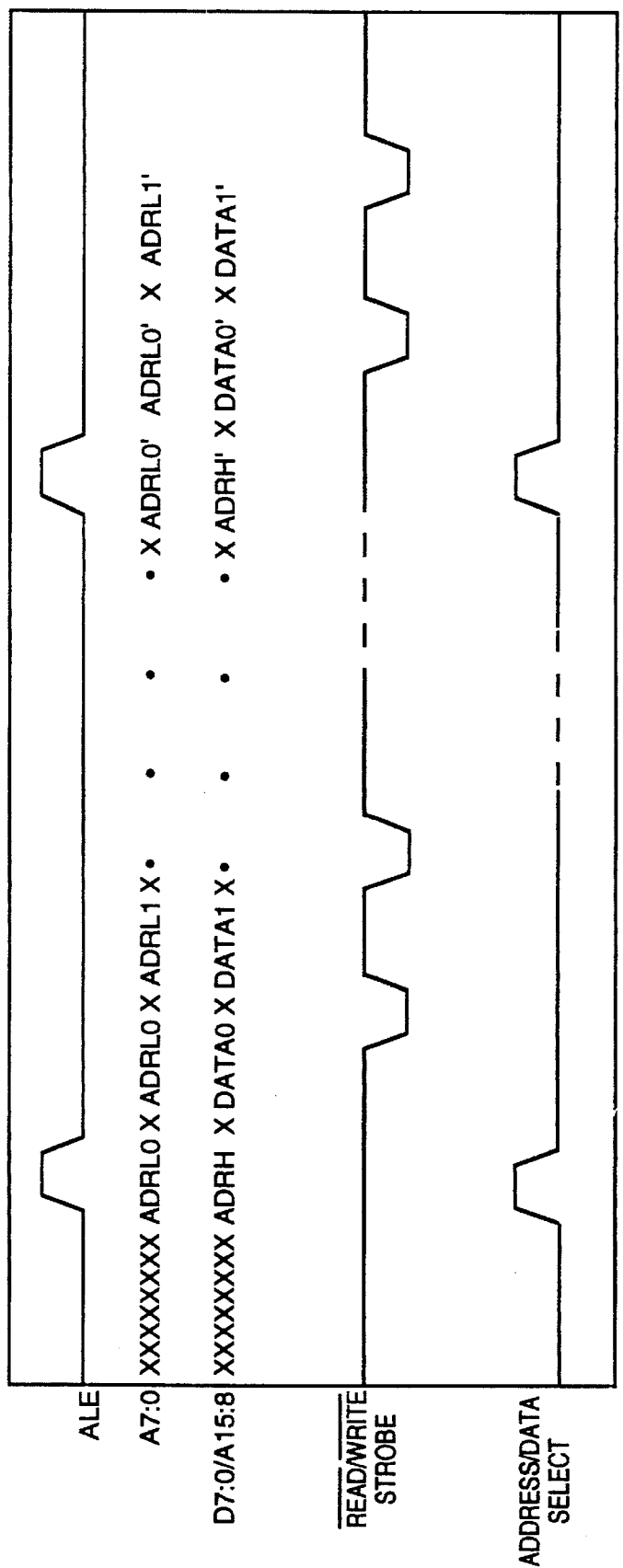
FIG. 4 is a timing diagram showing the multiplexing of data and address information.

FIG. 4 illustrates the timings of ALE, and the read and write strobes. Before ALE, the X's on A7:A0 and D7:D0/A15:A8 represent an initial unknown/don't care state. When ALE is asserted, the low order address bits of an initial address (AdrL0) are on A7:A0 and the high order address bits of the initial address (AdrH0) are latched in address latch 53. During the next bus cycle, AdrL0 is still on A7:A0, and the initial data read or written (Data0) is on D7:D0/A15:A8. As the next address, AdrL1 is being placed on A7:A0, where the X on the two buses shows a transition. Once AdrL1 is on A7:A0, the next read/write data Data1 is on D7:D0/A15:A8 when the next read/write strobe is generated. Data continues to be placed on D7:D0/A15:A8 until the high order bits of the address change at which time another ALE is generated and an address in a different 256 byte page represented by AdrL0' and AdrH' is placed on A7:A0 and D7:D0/A15:A8 respectively. At the next read/write strobe, AdrL0' remains on A7:A0 and Data0' is placed on D7:D0/A15:A8 and the process continues as described above.

I claim:

1. A circuit for multiplexing data and a first portion of an address on a first bus, said circuit including a second bus for carrying a second portion of said address, said circuit comprising:

a) a memory coupled to said first bus and said second bus;
   b) a first address latch coupled between said first bus and said memory, said first address latch latching said first portion of said address on said first bus;
   c) a multiplexor having a first input of data and a second input being said first portion of said address, said first portion being the high order bits of said address, the output of said multiplexor being coupled to said first bus; and
   d) means for controlling the operation of said memory, said first address latch, and said multiplexor so that said first bus carries said first portion of said address only when said first portion has a changed value from an immediately prior access, said controlling means including logic circuitry which determines when said first portion has said changed value.

2. The circuit defined by claim 1 wherein said controlling means comprises:

a) a second address latch coupled to said second input of said multiplexor;
   b) page hit logic coupled to said second input of said multiplexor and to said second address latch for generating a page hit signal which is a control input to said multiplexor; and
   c) a bus sequencer for controlling the placing of said first portion of said address for access by said first address latch.

3. The circuit defined by claim 2 wherein said controlling means further comprises:

a) a first buffer coupled between said multiplexor and said first address latch;
   b) a second buffer coupled between said first address latch and a central processing unit; and
   said first buffer for buffering data moving from said central processing unit to an external memory, said second buffer for buffering data moving from said external memory to said central processing unit.

4. A computer system including a processing unit, a memory external to said processing unit, an address bus coupled between said external memory and said processing unit, a data bus coupled between said external memory and said processing unit, said computer system further including peripheral units external to said processing unit, said computer system further comprising:

a circuit for multiplexing data and a first portion of an address on said data bus, said circuit including said address bus for carrying a second portion of said address, said circuit further including:

a) a memory coupled to said data bus and said address bus;
   b) a first address latch coupled between said data bus and said memory, said first address latch latching said first portion of said address on said data bus;
   c) a multiplexor having a first input of data and a second input being said first portion of said address, said first portion being the high order bits of said address, the output of said multiplexor being coupled to said data bus; and
   d) means for controlling the operation of said memory, said first address latch, and said multiplexor so that said data bus carries said first portion of said address only when said first portion has a changed value from an immediately prior access, said controlling means including logic circuitry which determines when said first portion has said changed value.

5. The system defined by claim 4 wherein said controlling means comprises:

a) a second address latch coupled to said second input of said multiplexor;
   b) page hit logic means coupled to said second input of said multiplexor and to said second address latch for generating a page hit signal which is a control input to said multiplexor; and
   c) bus sequencer means for controlling the placing of said first portion of said address for access by said first address latch.

6. The system defined by claim 5 wherein said controlling means further comprises:

a) a first buffer coupled between said multiplexor and said first address latch;
   b) a second buffer coupled between said first address latch and said processing unit; and
   said first buffer for buffering data moving from said processing unit to said external memory, said second buffer for buffering data moving from said external memory to said processing unit.

* * * * *